United States Patent
Piper

[15] 3,686,535
[45] Aug. 22, 1972

[54] ELECTROLYTIC CAPACITOR WITH SEPARATE INTERCONNECTED ANODE BODIES

[72] Inventor: John Piper, Greenville, S.C.

[73] Assignee: Union Carbide Corporation, New York, N.Y.

[22] Filed: July 2, 1971

[21] Appl. No.: 159,267

[52] U.S. Cl..................................317/230, 317/261
[51] Int. Cl. .............................................H01g 9/08
[58] Field of Search......................317/230, 231, 233

[56] References Cited

UNITED STATES PATENTS

| | | |
|---|---|---|
| 3,166,693 | 1/1965 | Haring et al...............317/230 |
| 3,196,323 | 7/1965 | Rogers et al...............317/230 |
| 3,345,545 | 10/1967 | Baurgault et al.........317/230 |
| 3,581,158 | 5/1971 | Shirek......................317/230 |

*Primary Examiner*—James D. Kallam
*Attorney*—Paul A. Rose et al.

[57] ABSTRACT

A capacitance device having improved high frequency characteristics comprising a plurality of solid tantalum capacitor units arranged in parallel with both anode and cathode connection made to strip-like terminals.

1 Claim, 5 Drawing Figures

Patented Aug. 22, 1972

3,686,535

2 Sheets-Sheet 1

INVENTOR
JOHN PIPER
BY
ATTORNEY

INVENTOR
JOHN PIPER
BY *Frederick J. M<sup>c</sup>Carthy*
ATTORNEY

ELECTROLYTIC CAPACITOR WITH SEPARATE INTERCONNECTED ANODE BODIES

BACKGROUND OF THE INVENTION

This invention relates to a capacitance device and more particularly to a solid electrolytic tantalum capacitance device.

Solid electrolytic tantalum capacitors of the type disclosed in U.S. Pat. No. 3,166,693 are widely used in the electronics industry because of their high volumetric efficiency, solid state construction and general stability. Such capacitors are particularly valued in the computer industry because of these and other advantages. As the frequencies at which electronic circuits operate are increased, for example, in modern high speed computers, high frequency performance of the capacitors beyond that normally obtained with solid tantalum capacitors is required.

It is an object of this invention to provide solid electrolytic tantalum capacitance devices which have improved high frequency electrical characteristics.

It is also an object of this invention to provide solid electrolytic capacitance devices which are well suited for use in high frequency decoupling applications.

It is a further object of this invention to provide miniature high frequency solid electrolytic tantalum capacitance devices.

Figure 2:
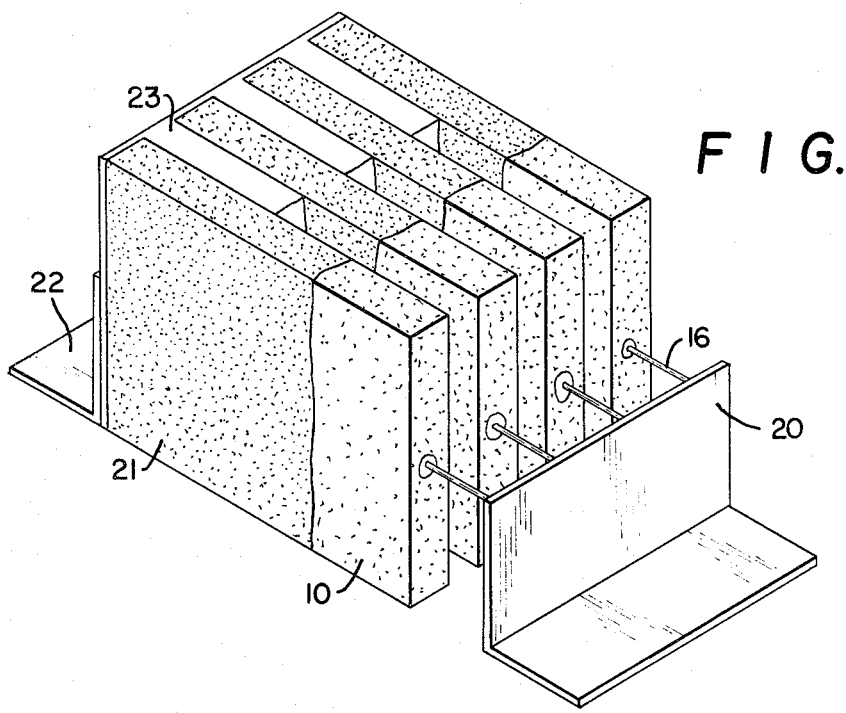
Figure 3:
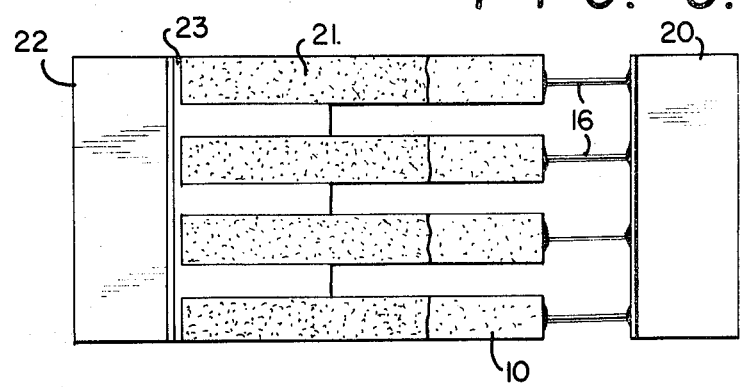
Figure 1:
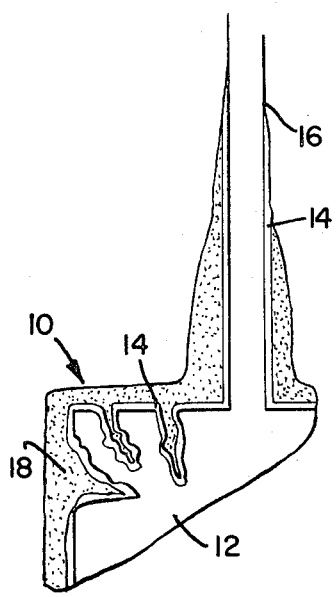
Figure 4:
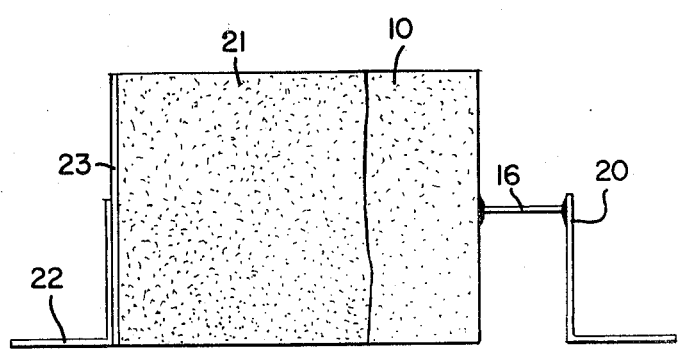
Figure 5:
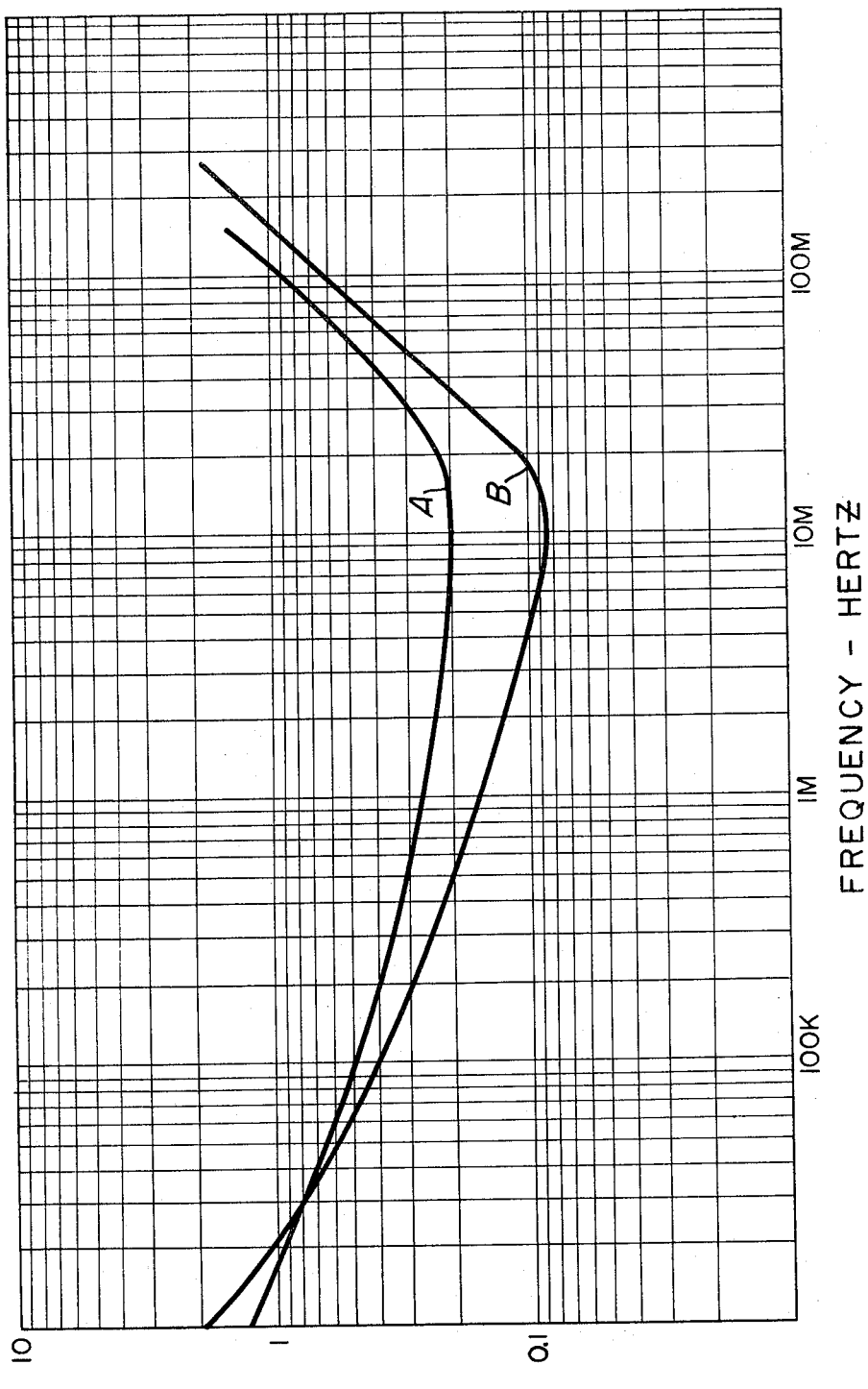

Other objects will be apparent from the following description and claims taken in conjunction with the drawing wherein FIG. 1 shows a partial fragmented view of a conventional solid tantalum capacitor FIG. 2 shows a perspective view of a capacitance device of the present invention FIGS. 3 and 4 show, respectively, a plan and elevational view of the device of FIG. 2 and FIG. 5 shows comparatively the improved high frequency characteristics of a capacitance device in accordance with the present invention In accordance with the objects of the present invention a capacitance device is provided comprising a plurality of slab-like porous anode bodies each formed of sintered particles of an anodizable metal, such as tantalum, with an anode riser lead of anodizable metal extending from an end face of each slab-like body, a dielectric oxide film formed on the exposed surfaces of said particles and on at least the portion of the riser lead adjacent each said anode body, a semiconductive electrolyte layer of manganese dioxide covering the surface of the dielectric oxide film in the pores and on the surface of each said anode body and on a portion of the riser lead, a conductive counterelectrode coating covering the major portion of the electrolyte layer on the surface of each said anode body other than in the area close to the vicinity where the riser lead extends from the anode body said plurality of slab-like anode bodies being arranged spaced-apart and parallel to each other and with the individual riser leads extending in the same direction, a strip-like metallic terminal connector extending transversely of the row of anode riser leads and electrically connected to each of said leads to form a common anode terminal for said capacitance device, a second strip-like metallic terminal extending parallel to the row of slab-like bodies, and a body of solder covering at least portions of the conductive counterelectrode coatings on the individual slab-like bodies and bridging spaces between said bodies and electrically connecting said conductive coatings in parallel to the second strip-like terminal connector to provide a common cathode terminal for said capacitance device.

There are two important features of the above described device of the present invention. It is important that the major portion, i.e. more than half, of the area of each of the constituent anode bodies be coated with a counterelectrode material of high electrical conductivity (e.g. a metal such as copper or a metal-containing material). By utilizing a multiplicity of anodes each having such a counter-electrode coating, the path length between the exterior of the capacitor and any element of capacitance, i.e. manganese dioxide coated tantalum pentoxide, has a minimum distance through relatively high resistive material (manganese dioxide). As a result, the effective series resistance, ESR, of the device is minimized. It is possible to obtain this necessary large external surface area for the capacitor group by utilizing a single anode formed with its exterior surface having re-entrant surfaces in order to maximize surface area. One of the disadvantages of this single anode approach however, is that in the construction of the capacitor, materials having a different coefficient of expansion from that of tantalum enter the re-entrant area and on thermal cycling can expose the capacitor to tensile forces which degrade it.

The other special characteristic of devices according to this invention is the multiplicity of parallel anode lead wires from the multianode composite. This arrangement results in a reduction of the inductance of the device and hence, its impedance at very high frequencies. A similar effect can be achieved with single anode devices by utilizing several lead wires emerging from each anode or by the use of a single anodizable strip of metal to form the connection. Both of these latter approaches cause significant difficulties in tantalum capacitor manufacture because they can easily result in extraordinary stresses at the point or points of lead wire (or strip) connection to the anode body.

With reference to the drawing, FIG. 1 shows a partial fragmented view of a conventional solid tantalum anode 10 wherein the sintered tantalum is indicated at 12, tantalum oxide dielectric at 14, and a tantalum riser at 16. A manganese dioxide electrolyte layer is shown at 18.

In the practice of the present invention a plurality of solid tantalum slab shaped anodes such as shown in FIG. 1 are provided with a conventional conductive counterelectrode coating, such as copper which which is indicated at 21 in FIG. 2. In the practice of the present invention, a major portion, i.e. more than half of the surface of each anode is covered by the conductive counterelectrode coating. The thus coated anodes are aligned parallel to each other as illustrated in FIGS. 2 through 5. With reference to FIGS. 2 through 5, it will be seen that the tantalum risers 16 are parallel to each other and are joined to a metallic strip 20 which provides a common anode terminal. A common cathode terminal is provided by metallic strip 22 which is joined by solder 23 to the slab shaped bodies 10.

With a device such as described, improved high frequency characteristics are obtained.

For example, a single solid tantalum capacitor having the properties shown in Table A was tested and found to have the frequency characteristics indicated at A in FIG. 5. More than one half of the outer surface of the capacitor was provided with a copper counterelectrode coating.

TABLE A

| Volume | Design Requirements |
| --- | --- |
| 0.200 in. X 0.200 in. X 0.125 in. | 0.1 ohm from 2 to 20 megahertz |

When five solid tantalum capacitors having essentially the same overall volume (0.200 in X 0.200 in X 0.125 in) as the aforementioned single capacitor were arranged and connected in accordance with the present invention, the frequency characteristics indicated at B in FIG. 5 were obtained. The properties of the aforementioned capacitors are set forth in Table B. More than one half of the outer surfaces of each capacitor was provided with a copper counterelectrode coating.

TABLE B

| Volume | Design Requirements |
| --- | --- |
| 0.200 in. X 0.200 in. X 0.125 in. | 0.1 ohm from 2 to 20 megahertz |

It can thus be seen that by arranging and connecting a plurality of slab shaped solid tantalum capacitors in accordance with the present invention a device having improved high frequency characteristics is obtained.

What is claimed is:

1. A capacitive device comprising a plurality of slab-like, porous tantalum anode bodies having formed thereon a dielective oxide film and having an electrolyte layer of manganese dioxide, each of said anode bodies having tantalum riser wires extending therefrom and being arranged in a parallel row with side faces of the anode bodies adjacent to but spaced apart from each other and with the individual riser wires extending in the same direction, a first strip-like metallic terminal extending transversely of the row of anode riser wires and electrically connected to each of said anode riser wires to form an anode terminal for said capacitance device, a second strip-like terminal extending transversely of the row of slab-like bodies, a conductive counterelectrode coating covering the major portion of the electrolyte layer on the surface of each anode body and a body of solder covering at least portions of the conductive counterelectrode coatings on the individual slab-like bodies and bridging the spaces between said bodies and electrically connecting said conductive coatings in parallel to the second strip-like terminal to provide a cathode terminal for said capacitance device.

* * * * *